(12) United States Patent
Scaries

(10) Patent No.: US 6,669,529 B1
(45) Date of Patent: Dec. 30, 2003

(54) TURKEY CALL

(76) Inventor: Joseph L. Scaries, 324 Wilderness Way, Berkeley Springs, WV (US) 25411

( * ) Notice: Subject to any disclaimer, the term of this patent is extended or adjusted under 35 U.S.C. 154(b) by 2 days.

(21) Appl. No.: 10/372,292

(22) Filed: Feb. 25, 2003

(51) Int. Cl.[7] ................................. A63H 5/00
(52) U.S. Cl. ..................... 446/397; 446/402; 446/418
(58) Field of Search ................. 446/397, 402, 446/418

(56) References Cited

U.S. PATENT DOCUMENTS

| | | | |
|---|---|---|---|
| 2,958,157 A | * | 11/1960 | Tannehill |
| 3,208,184 A | | 9/1965 | Wisor |
| 3,716,943 A | | 2/1973 | Orzetti |
| 4,041,639 A | | 8/1977 | Funk |
| 4,310,986 A | | 1/1982 | Jacobs |
| 4,606,733 A | * | 8/1986 | Willis .......................... 446/397 |
| 4,648,852 A | | 3/1987 | Wingate |
| 4,662,858 A | | 5/1987 | Hall |
| 4,941,858 A | | 7/1990 | Adams |
| 4,955,845 A | * | 9/1990 | Piper .......................... 446/397 |
| 4,988,325 A | | 1/1991 | Alderson et al. |
| 5,503,585 A | * | 4/1996 | Heineman .................... 446/397 |
| 5,716,254 A | | 2/1998 | Bowes |
| 5,961,367 A | | 10/1999 | Morris |
| 6,210,252 B1 | * | 4/2001 | Anderson .................... 446/418 |
| 6,264,527 B1 | | 7/2001 | Sabol, Jr. |

* cited by examiner

Primary Examiner—Derris H. Banks
Assistant Examiner—Ali Abdelwahed
(74) Attorney, Agent, or Firm—Lawrence R. Franklin

(57) ABSTRACT

In a turkey call, the gripping force of the sounding block on the vibratory rod is controlled, so that the length of the rod which protrudes from the resonant chamber of the sounding block can be adjusted by hand while in the field.

22 Claims, 3 Drawing Sheets

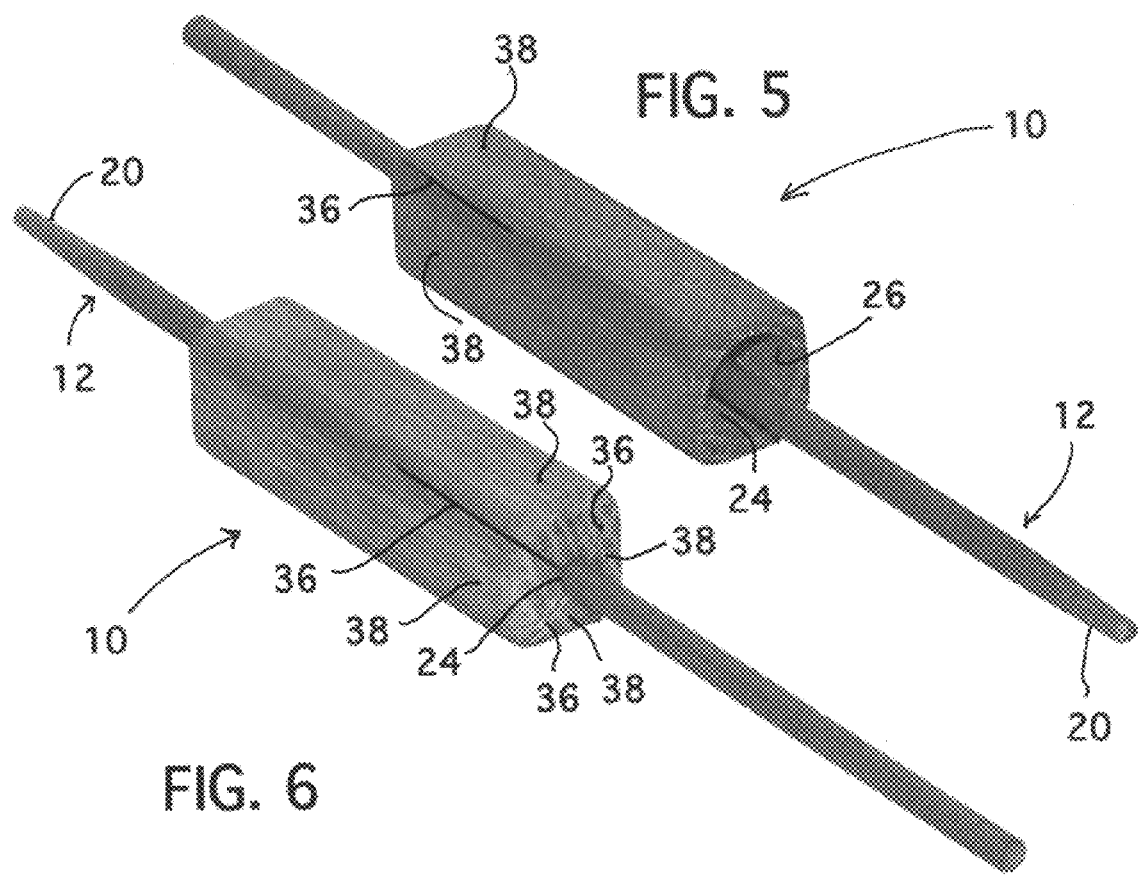

TURKEY CALL

BACKGROUND OF THE INVENTION

1. Field of the Invention

This invention relates to a turkey call, a device which simulates the sound of a wild turkey.

2. Description of Related Art

Animal calls have been widely used for centuries by hunters, naturists, and photographers to attract turkeys, squirrels, and other wild game. The disclosed invention is written in terms of turkeys, but the applicability of its principles to other game is obvious.

There are many types of calls, mechanical and electronic, but the most widely used is the so-called "friction" or "rubbing" resonator call (Hall, U.S. Pat. No. 4,662,858) in which a vibratory rod with a resonant sounding block attached thereto, is rubbed on a soundboard. Skilled users are able to produce the desired sound. See Wisor, U.S. Pat. No. 3,208,184, Orzetti, U.S. Pat. No. 3,716,943, Funk, U.S. Pat. No. 4,041,639, Jacobs, U.S. Pat. No. 4,310,98, Wingate, U.S. Pat. No. 4,648,852, and Sabol, Jr., U.S. Pat. No. 6,264,527.

As shown in these patents, the most common prior art block is cylindrical and includes an axially extending resonant cavity opening through one end and a smaller bore for receiving the rod continuing therethrough to the other end. The rod is fixedly secured within the smaller bore and extends coaxially with the sounding block. The combination of rod and block is often referred to as a "striker" and the soundboard as a "striking plate." The soundboard is held in one hand while the tip of the vibratory rod is held in the other. The tip is scraped across the surface of the plate, causing the rod to vibrate. The sounding block vibrates in response, and both vibrations are tuned and amplified by the resonant cavity. The striking plate also vibrates, adding to the emitted call. Properly done, the emanating sound mimics the cry of a wild turkey.

There are a wide variety of types of turkeys, young, old, male, female, each of which produce different sounds. Other sounds are produced when those same turkeys are engaged in different types of activities. Since the caller wishes to attract all of these, it is obvious that in order to be successful in the field, one must be able to produce a variety of calls; see Hall, supra, and Adams, U.S. Pat. No. 4,941,858.

The tone and timbre of the sound produced by conventional turkey callers is a function of all three elements: the striking plate, sounding block, and vibratory rod. The structure of each is fixed at manufacture, so each turkey call emits essentially only one call. Experienced callers create different sounding calls by holding the striking plate more or less tightly (Jacobs, supra) or by rubbing the vibratory rods against the striking plate with different pressures (Funk, supra) and/or with different types of strokes (Orzetti, supra), but these produce only minor variations of the basic call.

Some in the prior art have attempted to provide a single turkey call which can produce a variety of sounds, but to the inventor's knowledge, the emphasis has been on modifying the soundboard. Adams and Sabol, supra, replaced the soundboard with a resonating box capable of emitting a plurality of selectable sounds. They are successful for their intended purpose, but they tend to be bulky, complicated, and easily damaged.

The last resort is to carry a variety of different turkey calls (Sabol, supra). While effective, this becomes cumbersome to the already overloaded enthusiast.

A single turkey call which can produce a variety of sounds is needed. The disclosed invention meets that need.

Conceptually significant to the instant invention are the patents to Wisor and Hall, supra.

Wisor discloses a vibratory rod 46–48 which is adjustable relative to the sounding block 6 in order to change the length of the rod which is exposed beyond the block. Wisor teaches:

"It should be noted that the bore 16 extends all the way through the bottom 18 and that the portion 46 of the peg [i.e., vibratory rod] which is anchored therein is capable of being pushed through the bore all the way or partly so in order to thus shorten the free vibratory portion 48 of the peg. Experience has shown that this highly significant adjustable peg anchoring feature 16 and 46 has much to do with perfection of the quality of tone which is necessary to imitate a good and convincing turkey yelp." Wisor, column 3, lines 32–40.

Thus, Wisor teaches that the tone and timbre of his turkey call is dependent upon the length of the vibratory portion of his vibratory rod, not a new concept, for musicians have tuned rigid vibrators that way for centuries. Wisor continues by suggesting that the connection between the rod and block should be made in such a way that they are relatively adjustable. A close reading of the patent, however, shows he clearly intends the adjustments to be made prior to taking it into the field, else the cap 40 would not fit on the sounding block when tuning the striker results in the peg extending beyond the bottom of the block (FIG. 3, column 2, last sentence). It is also clear Wisor does not even consider the possibility of the adjustment being made by hand in the field. This can be inferred from the terms used to describe the connection of rod and block: "friction fitted but slidingly adjustable" (column 3, lines 4–5), "peg which is anchored therein" (column 3, line 34), and "peg anchoring feature" (column 3, line 38). It is clear that the peg is to be relatively fixed, anchored, within the block but not permanently, e.g., as by gluing, so that it cannot be forced to slide. This type of force fit cannot be achieved and adjusted by hand; tools must be used, and taking tools into the field replaces one problem with another. There is nothing in Wisor which states explicitly nor which would imply to one skilled in the art the concept that the adjustability should be effected by hand or could be effected in the field.

Hall fixes the vibratory rod to the sounding block such that the vibratory rod has a shorter end projecting beyond one end of the sounding block and a longer end projecting from the other end of the sounding block. He teaches that the sound produced by the call depends upon which end of the rod is scratched against the soundboard, a variation of the Wisor teaching concerning the effect of the length of the vibratory end. Hall also intends the lengths to be fixed at manufacture, not to be adjustable at all, and certainly not adjustable by hand in the field.

The problem faced by Wisor and Hall was in finding a way to maintain a solid connection between the vibratory rod and the sounding block while permitting adjustments in relative positioning therebetween. It is recognized throughout the industry that the connection between rod and block must be firm. Otherwise, vibrations from the rod will not be effectively transmitted to the block for tuning and amplification. On the other hand, in order to be loose enough to be adjusted manually, the connection cannot be too tight. Prior attempts favoring making the striker rod loose enough to be easily moved by hand within the striker block has resulted in poor acoustical connections producing weak calls with poor tonal qualities which have proved to be woefully ineffective. The two criteria are seemingly mutually exclusive, and, until now, it has not been possible to combine them in a single striker.

OBJECTS AND SUMMARY OF THE INVENTION

The present invention overcomes the difficulties described above by providing a turkey call in which the orientation of the vibratory rod relative to the sounding block can be changed by hand in the field.

It is an object of the invention, therefore, to provide a turkey call which permits the tone and timbre of its call to be changed at will by hand in the field.

It is a further object of the invention to provide a turkey call in which the striker is adjustable in order to change the sound produced by the turkey call.

It is a further object of the invention to provide a turkey call in which the connection between the vibratory rod and the sounding block is sufficiently tight that vibrations from the rod are effectively transmitted to the block for tuning and amplification while being loose enough that the rod is easily manipulated to slide within the striker block.

BRIEF DESCRIPTION OF THE DRAWINGS

The foregoing and other objects, aspects, uses, and advantages of the present invention will be more fully appreciated as the same becomes better understood from the following detailed description of the present invention when viewed in conjunction with the accompanying drawings, in which:

FIG. 5 is a perspective left side view of the preferred turkey calling striker of the invention comprising the vibratory rod of FIG. 1 attached to the sounding block of FIGS. 2–4;

FIG. 6 is a perspective right side view of the turkey calling striker of FIG. 5;

DETAILED DESCRIPTION OF THE PREFERRED EMBODIMENT

Figure 1:
FIG. 1 is a perspective side view which illustrates a vibratory rod of a preferred embodiment of a turkey calling striker of the present invention.
Figures 2, 3, 4:
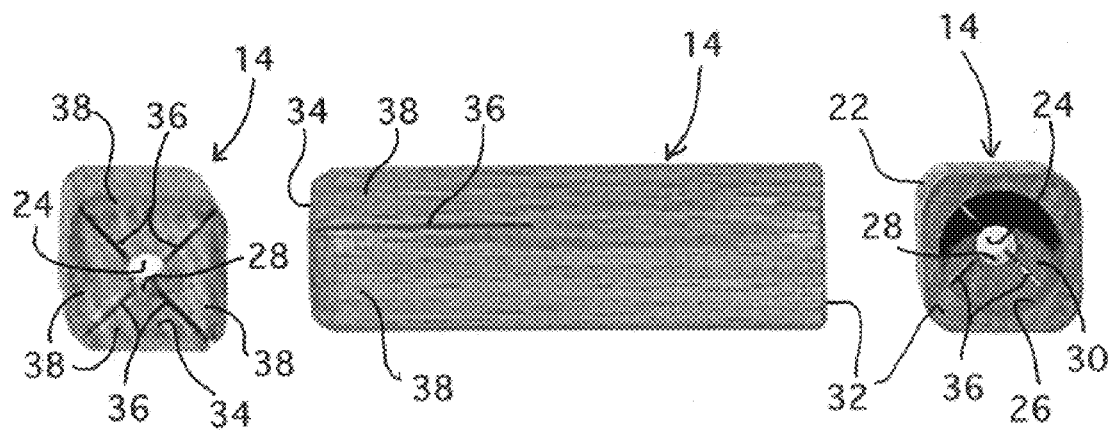
FIG. 2 is a perspective side view of a preferred sounding block for use with the turkey calling vibratory rod of FIG. 1.
FIG. 3 is a perspective view of the back end of the sounding block of FIG. 2.
FIG. 4 is a perspective view of the front end of the sounding block of FIG. 2.

Turning to FIGS. 1–8, a preferred embodiment of the inventive turkey caller is depicted. Striker 10 (FIGS. 5–8) comprises two unitary elements: a vibratory rod 12 (FIG. 1) and a sounding block 14 (FIGS. 2–4).

Rod 12 comprises a solid, wooden shaft 16 of substantially constant diameter, which is relatively squared-off at one end 18 and tapers to a blunt point at the other end 20. It is equally preferred that rod 12 be tapered to a blunt point at both ends, so that the rod can be inserted into the sounding block in either direction. Rod 12 has been referred to in the art as a peg, pin, dowel, vibratory peg, vibratory post, vibratory striker, striker rod, stylus, and stylus needle. Its various names provide a comprehensive description of its shape and function. It is the primary sound generating or vibratory element of striker 10.

Sounding block 14 (also referred to in the art as a tone tube, striker handle, hard wood block, and a striking block) comprises a one-piece, solid, cylindrical tube made of wood. A square cross-section is shown in FIGS. 2–8 for the external cross-sectional configuration 22, but it is most usually circular. The interior of block 14 comprises a through bore 24 having a pair of stepped diameters, a relatively large diameter bore 26 and a relatively small diameter bore 28. Large diameter bore 26 forms a resonant chamber. Even though it is the portion 30 of the wall surrounding small diameter bore 28 which grips rod 12, when it is received therein, small diameter bore 28 will, for convenience, be referred to herein and in the claims as gripping channel 28. Resonant chamber 26 opens through the front end 32 of block 14, and gripping channel 28 opens through the back end 34 of block 14. In the preferred embodiment, resonant chamber 26 is cylindrical with a circular cross-section (FIG. 4), inasmuch as the frequency to which it is tuned is more easily controlled when a circular cross-section is used. Other shapes and relative dimensions of resonant chamber 26 are envisioned, being dependent on the type and quality of sound desired to be emitted from sounding block 14, and are within the routine abilities of one skilled in the art.

In this preferred embodiment, vibratory rod 12 is made of wood and is approximately nine inches long, although the length can vary for each individual striker. Block 14 is also made of wood and is approximately three inches long and one inch in maximum width. The depth of resonant chamber 26 comprises approximately two-thirds of the axial length of sounding block 14, and its diameter is about three-fourths of the width of block 14.

In use, the user scratches a tapered end 20 on a soundboard (not shown) to produce the vibrations necessary to generate the desired turkey call. Block 14 vibrates with rod 12, and chamber 26 is tuned to resonate at the desired tone and timbre.

As will be appreciated, the tone and timbre of the call which was preset at manufacture is not always the one produced in the field. Changes in atmospheric conditions, e.g., heat, rain, and humidity, alter the size and shape of the turkey call, causing the sound produced thereby to change. Calls made entirely of wood, such as those of Wisor, Orzetti, Funk, and Jacobs, supra, for instance, are particularly susceptible, plus they have special problems; they can swell, when exposed to rain or high humidity, to such a degree that the separate components thereof freeze together into one rigid mass. Even calls with plastic parts, such as Wingate, Adams, supra, and Morris, U.S. Pat. No. 5,961,367, change with the weather; the plastic softens slightly when subjected to heat and hardens slightly when exposed to very cold temperatures, not much but enough to affect its sound output. When the sound produced by the call no longer is appropriate for the situation, it becomes useless baggage. Either the user does without or is forced to carry other, differently tuned calls, which also may or may not work in the instant environment. A problem with prior strikers is the inability to easily adjust the caller to control the sound it generates. A need, therefore, exists for a turkey call which is capable of being manually adjusted easily in the field to compensate for changing conditions. The inventor has satisfied that need.

FIGS. 5–6 show vibratory rod 12 and sounding block 14 assembled to form striker 10. Rod 12 is inserted through bore 24 and extends beyond both ends 32 and 34 of block 14. As aforementioned, the tone of the resonating sound depends upon the length of rod which extends out of resonant chamber 26. In known calls, the length is essentially fixed prior to taking it into the field. In this preferred embodiment of turkey calls, block 14 has four longitudinal slots 36 (FIG. 3) formed therein. Slots 36 open through back end 34, extend through the portion of the wall 30 (FIG. 4) surrounding bore 28, and open into resonant chamber 26. Slots 36 divide back end 34 into four fingers 38 (FIG. 3) which, being made of wood, are slightly resilient. The diameter of rod 12 is selected to be slightly more than the diameter of bore 28, so that when rod 12 is inserted therein, fingers 38 are flexed outwardly, allowing passage of rod 12 therethrough while creating a return biassing force for gripping rod 12. The gripping force is a function of the flexibility of the wood, the length of fingers 38, and the differential in diameters between rod 12 and bore 28 through block 14. The combination is selected, so that in their quiescent state, fingers 38 grip rod 12 firmly enough to ensure good transmissions of vibrations from rod 12 to block 14. But when rod 12 is subjected to manual manipulation, i.e., moved solely by hand without the use of tools, fingers 38 flex sufficiently to allow relative sliding movement between rod and block. Upon cessation of manual control thereof, fingers 38 again tightly grip rod 12. By the resilient flexing of wall 30, the previously impossible marriage of acoustical transmission between rod and block and of manual tuning of the striker is achieved.

Figure 7:
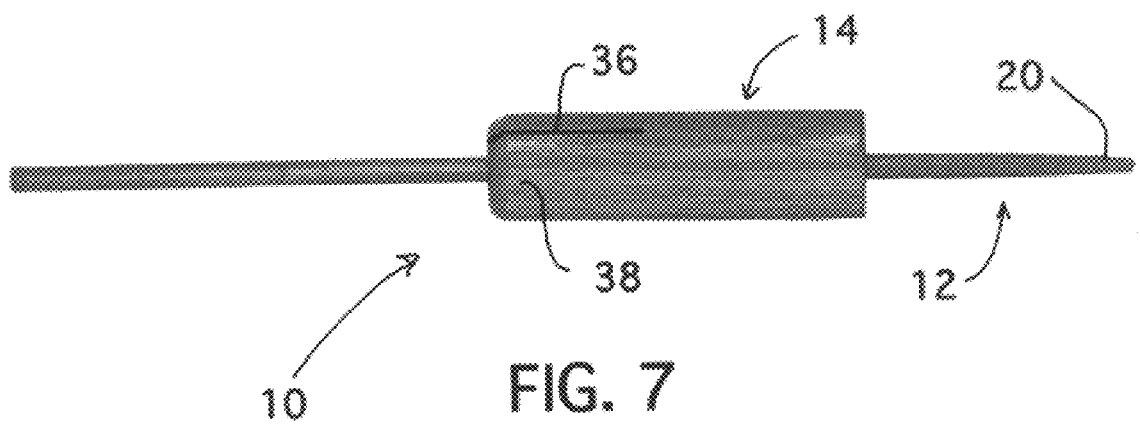
FIG. 7 is a perspective right side view of the turkey calling striker of FIGS. 5–6 showing the vibratory rod inserted through the sounding block in one adjusted position.
Figure 8:
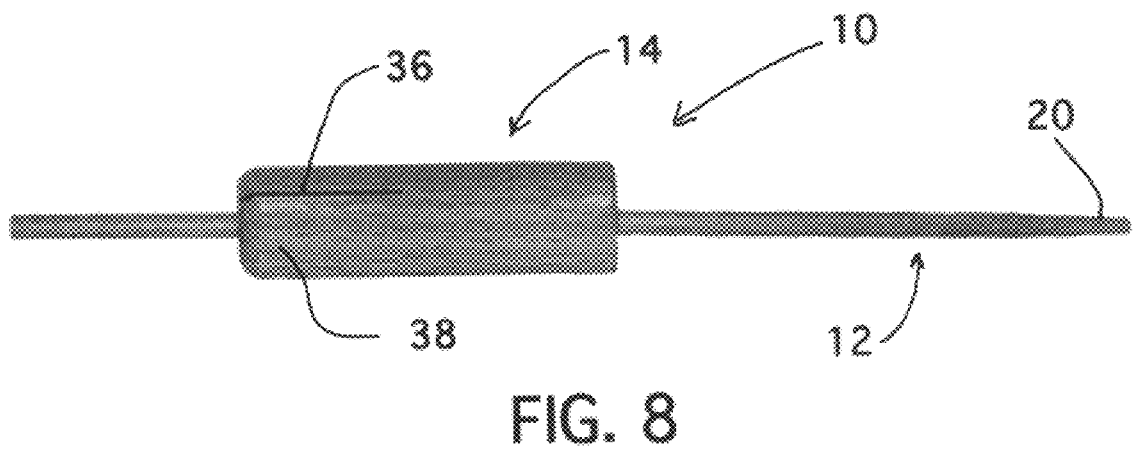
FIG. 8 is a perspective left side view of the turkey calling striker of FIGS. 5–6 showing the vibratory rod inserted through the sounding block in another adjusted position.

FIGS. 7 and 8 show two operational modes of rod 12 and block 14. Tapered end 20 is shown as extending from resonant chamber 26 in both modes, although it is also functional when extending from the back end 34. A third mode utilizes a rod with a tapered end at both ends, so both ends 32 and 34 of block 14 have a tapered end extending therefrom for individual use. In FIG. 7, the length of rod 12 protrudes a relatively shorter distance from block 14, producing a higher pitched sound. In FIG. 8, the length of rod 12 protrudes a relatively longer distance, producing a lower pitched sound. The operational modes shown are but two of the infinite number available by sliding block 14 along shaft 16 of rod 12. By manually adjusting the length of rod 12 which protrudes from block 14 while listening to the sounds produced thereby, the proper tone and timbre can be developed, thus compensating for changing weather conditions. The turkey caller carried into the field is always useful, is not excess baggage, and no other call need be carried as a backup.

The invention has been disclosed in terms of a wooden rod and a wooden block with four slots, since that is the best mode contemplated at the time of the invention, but the invention permits of many variations.

Turkey striker 10 can be manufactured from other materials with satisfactory results. Plastic, especially, has many desirable qualities. It can be molded in any shape to any degree of precision, so the desired characteristics of the call can be intentionally designed therein. The size and shape of resonant channel 26 can be tuned to the desired frequency, the thickness of the wall surrounding channel 26 can be selected for its resonance and timbre, and the external shape can be selected for both aesthetic style and ease of handling. The modulus of elasticity, on which the flexibility of fingers 38 depends, can be controlled much more closely than with wood, so the gripping force can be preselected within a narrow margin. Because of the control afforded over all parameters when molded of plastic, individual consistency between a plurality of calls can be maintained.

Further, plastic is much less susceptible to change with the weather than is wood. Moisture has virtually no effect on plastic, certainly not to the degree it has on wood. Temperature fluctuations produce minimal effects, and whatever changes do occur from changes in moisture, humidity, or temperature are easily compensated for in the field by the adjustability of rod 12 within block 14.

Nor is it critical that both rod and block be made of the same materials. The material of rod 12 is selected primarily for its durability, its frictional properties relative to the intended soundboard upon which it is scraped, and its ability to vibrate and transfer those vibrations to block 12. The desired characteristics of the material of block 12 center around its tonal qualities. Wood is preferred. A viable combination, therefore, is a wooden block and a plastic rod, although a plastic block and a wooden rod is also effective as a call. In addition, the type of wood selected for each embodiment is a variable upon which the tone is dependent.

Other variables than materials are also result effective.

Four slots 36 are shown. Other numbers of slots are possible, even one, so long as the leverage produced by a slight canting of rod 12 causes the fingers which define the gripping channel 28 to flex sufficiently to allow slippage of rod 12 within block 14.

External shape 22 can take on any desired shape, and other shapes, such as rectangular, hexagonal, octagonal, etc., can be used.

All of the above as well as other patentable equivalents suggested to one skilled in the art by the disclosure are considered within the purview of the invention. It is important, therefore, that the claims be regarded as including such equivalent constructions insofar as they do not depart from the spirit and scope of the present invention as defined in the appended claims.

The purpose of the foregoing Abstract is to enable the U.S. Patent and Trademark Office, and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of the application, which is measured solely by the claims, nor is intended to be limiting as to the scope of the invention in any way.

I claim as my invention:

1. A striker for an animal call, comprising:
   a vibratory rod, said rod comprising a shaft having a substantially constant diameter and a tapered end, said tapered end terminating in a blunt point; and
   a sounding block, said sounding block comprising a surrounding wall which defines a through bore, said through bore comprising a larger diameter bore formed by a first portion of said surrounding wall and a smaller diameter bore formed by a second portion of said surrounding wall, said second portion of said surrounding wall gripping said rod fitting within said smaller diameter bore with firm enough contact to ensure good transmission of vibrations from said rod to said sounding block while flexing sufficiently to allow axial adjustment of said rod when being adjusted therein solely by hand.

2. The striker of claim 1 wherein said larger diameter bore comprises a resonant chamber and said smaller diameter bore comprises a rod gripping channel.

3. The striker of claim 2 wherein said second portion of said surrounding wall of said sounding block comprises a resilient, flexible material which grips said rod, when said surrounding wall is in its quiescent state, and which flexes sufficiently to allow relative sliding movement therebetween, when said rod is subjected to manual manipulation.

4. The striker of claim 2 wherein said sounding block is elongated and has a first end and a second end, said resonant chamber opens through said first end of said block, said gripping channel opens through said second end of said block, and said resonant chamber communicates with said gripping channel.

5. The striker of claim 4 wherein said second portion of said surrounding wall of said sounding block includes at least one slot opening through said second end of said block, said slot allowing said second portion of said surrounding wall to flex, thus allowing said gripping channel to expand, whereby said rod can be moved manually within said block.

6. The striker of claim 5 wherein said sounding block includes a plurality of slots forming a plurality of fingers, each of said plurality of fingers being flexible and including a restoring biassing force when flexed said rod diameter is larger than said smaller diameter bore, whereby said rod is gripped by the restoring biassing force of the flexed fingers.

7. The striker of claim 6 wherein manual manipulation of said rod causes at least one of said fingers to flex to reduce a gripping force of said fingers on said rod.

8. The striker of claim 1 wherein said rod and said block are both made of wood.

9. The striker of claim 1 wherein said rod and said block are both made of plastic.

10. The striker of claim 1 wherein one of said rod and said block is made of plastic and the other is made of wood.

11. A striker for an animal call, comprising:
a vibratory rod; and
a sounding block, said sounding block including resilient means for gripping said vibratory rod at each of a plurality of selected positions such that a corresponding each of a plurality of selected lengths of said vibratory rod extends out of said sounding block, said resilient means gripping said vibratory rod at said each of said plurality of selected positions tightly enough to ensure good acoustical transmission of vibrations between said vibratory rod and said sounding block while flexing sufficiently to permit adjustment solely by hand of said rod within said block to another of said plurality of selected positions.

12. The striker of claim 11 wherein said sounding block further includes a through bore, and said rod is received within said through bore.

13. The striker of claim 12 wherein said through bore comprises a larger diameter bore and a smaller diameter bore, said larger diameter bore comprising a resonant chamber and said smaller diameter bore comprising a rod-gripping channel.

14. The striker of claim 13 wherein said sounding block includes a wall surrounding and defining said through bore, a portion of said wall which defines said through bore comprises said resilient gripping means, said portion of said wall comprising a resilient, flexible material which grips said rod when in its quiescent state while flexing sufficiently to allow relative sliding movement therebetween when said rod is subjected to manual manipulation.

15. The striker of claim 14 wherein said sounding block is elongated and has a first end and a second end, said resonant chamber opens through said first end of said block, said gripping channel opens through said second end of said block, and said resonant chamber communicates with said gripping channel, and wherein said sounding block includes at least one slot opening through said second end of said block, said slot allowing said gripping channel to expand, whereby said rod can be moved manually within said block.

16. The striker of claim 15 wherein said rod comprises a shaft having a substantially constant diameter and a first and second end, at least one of said first and second ends being a tapered end, said tapered end terminating in a blunt point, and said sounding block includes a plurality of slots forming a plurality of fingers, each of said plurality of fingers being flexible and exerting a restoring biassing force when flexed said rod diameter being larger than said smaller diameter bore, whereby said rod is gripped by the restoring biassing force of the flexed fingers.

17. The striker of claim 16 wherein both of said first and second ends of said rod are tapered and extend, respectively, beyond both said first and second ends of said sounding block.

18. The striker of claim 11 wherein said rod and said block are both made of wood.

19. The striker of claim 11 wherein said rod and said block are both made of plastic.

20. The striker of claim 11 wherein said rod is made of plastic and said block is made of wood or vise versa.

21. A striker for an animal call, comprising:
a vibratory rod, said vibratory rod comprising a shaft having a substantially constant diameter and a pair of ends, at least one of said ends tapering to a blunt point; and
a sounding block, said sounding block comprising a cylindrical wall, said cylindrical wall comprising a first portion forming a gripping channel and a second portion forming a resonant chamber, said gripping channel and said resonant chamber being relatively oriented within said cylindrical wall to define a through bore extending axially through said cylindrical wall;
said vibratory rod being positioned within said through bore with said first portion firmly gripping said vibratory rod and said vibratory rod freely passing through said resonant chamber;
said first portion being sufficiently resilient that said vibratory rod is movable within said gripping channel solely by hand without the use of tools to a plurality of positions, said vibratory rod being gripped in each of said plurality of positions by said first portion firmly enough to ensure good transmission of vibrations from said rod to said sounding block.

22. A striker for an animal call, comprising:
a vibratory rod; and
a sounding block, said sounding block comprising means for gripping said vibratory rod such that said vibratory rod is movable within said gripping means solely by hand without the use of tools to a plurality of positions, said vibratory rod being gripped in each of said plurality of positions by said gripping means firmly enough to ensure good transmission of vibrations from said vibratory rod to said sounding block, and said sounding block further comprising resonant means for resonating with the vibrations of said vibratory rod.

* * * * *